(12) United States Patent
Li et al.

(10) Patent No.: US 12,047,197 B2
(45) Date of Patent: Jul. 23, 2024

(54) SMART HARNESS MANAGEMENT FOR LOW-VOLTAGE DISTRIBUTION

(71) Applicant: Rivian IP Holdings, LLC, Irvine, CA (US)

(72) Inventors: Ming Li, Torrance, CA (US); Steven Schulz, Torrance, CA (US); Yang Liu, Irvine, CA (US); Tyler Erikson, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 169 days.

(21) Appl. No.: 17/709,618

(22) Filed: Mar. 31, 2022

(65) Prior Publication Data

US 2023/0318871 A1   Oct. 5, 2023

(51) Int. Cl.
*H02J 7/00* (2006.01)
*H04L 12/40* (2006.01)

(52) U.S. Cl.
CPC .......... *H04L 12/40* (2013.01); *H02J 7/00041* (2020.01); *H02J 2310/48* (2020.01); *H04L 2012/40215* (2013.01)

(58) Field of Classification Search
CPC ... H02J 7/00041; H02J 2310/48; H04L 12/10; H04L 12/40; H04L 12/40169; H04L 2012/40215; Y02T 10/70

USPC .......................................................... 307/18
See application file for complete search history.

(56) References Cited

U.S. PATENT DOCUMENTS

| 2018/0351399 A1* | 12/2018 | Frey ........................ H02J 9/062 |
| 2020/0142462 A1* | 5/2020 | Durham .................... G06F 1/26 |

FOREIGN PATENT DOCUMENTS

WO   WO2021149488   *   7/2021

* cited by examiner

*Primary Examiner* — Rexford N Barnie
*Assistant Examiner* — Xuan Ly
(74) *Attorney, Agent, or Firm* — Haley Guiliano LLP

(57) ABSTRACT

A low-voltage distribution board and a direct current fast charging (DCFC) system including the low-voltage distribution board are provided. The DCFC system includes a power supply and a plurality of loads connected by a serial bus. The low-voltage distribution board includes a first input connector configured to receive power from the first power supply, and a first plurality of output connectors configured to be connected to the first plurality of loads. The low-voltage distribution board further includes a first current distribution circuit configured to provide, through the first plurality of output connectors, the received power from the first power supply to the first plurality of loads, and an identification (ID) assignment circuit configured to provide, through the first plurality of output connectors, different ID values to each of the first plurality of loads.

20 Claims, 5 Drawing Sheets

SMART HARNESS MANAGEMENT FOR LOW-VOLTAGE DISTRIBUTION

INTRODUCTION

Electronic systems, such as charging systems for charging electric vehicles, generally include numerous low-voltage loads. In one approach, a mechanical assembly (e.g., a busbar and harness assembly) is used to provide power to each of the numerous low-voltage loads in a charging system.

SUMMARY

In such an approach, the charging system is not able to provide status monitoring, intelligent sensing, reset, protection, etc., of the low-voltage loads without, e.g., providing a wiring harness having dedicated wiring for separately connecting with each of the low-voltage loads. Thus, in the event of a fault (e.g., a short circuit of one or more of the low-voltage loads), the charging system may be damaged. Further, it may be difficult for an operator to determine the source of the fault without physically examining the charging system. Still further, if a wiring harness having dedicated wiring is provided, it may be difficult to route the harness assembly through the charging system.

Consequently, what is needed are techniques to provide a power distribution system that efficiently routes power to low-voltage loads of a charging system or other electronic system, while providing status monitoring of the loads, identification of faulty loads, and fault protection. It may also be advantageous to provide techniques that provide for faulty loads to be replaced or additional loads or power supplies to be added to a charging system.

To solve one or more of these problems, systems and methods are provided to improve distribution of low-voltage power to loads of a direct current fast charging (DCFC) system and intelligent monitoring and protection of the loads, and may include a smart harness having a low-voltage distribution board for connecting a plurality of power supplies to a plurality of loads.

To solve one or more of these problems, a low-voltage distribution board, a direct current fast charging (DCFC) system including the low-voltage distribution board, and a method for assigning unique communication IDs are provided. The DCFC system includes a first power supply, a first plurality of loads connected by a serial bus, and a low-voltage distribution board. The low-voltage distribution board includes: a first input connector configured to receive power from the first power supply; a first plurality of output connectors, wherein the first plurality of output connectors is configured to be connected to the first plurality of loads; a first current distribution circuit configured to provide, through the first plurality of output connectors, the received power from the first power supply to the first plurality of loads; and an identification (ID) assignment circuit configured to provide, through the first plurality of output connectors, different ID values to each of the first plurality of loads.

In some embodiments, the serial bus may be a controller area network (CAN) bus, each of the first plurality of loads may be connected to a master controller by the CAN bus, and the master controller may be configured to automatically assign a different CAN ID to each of the first plurality of loads based on a respective ID value of the different ID values.

In some embodiments, each of the first plurality of loads may be a same type of load.

In some embodiments, the ID assignment circuit may include a voltage divider circuit, and the different ID values may include different voltage levels provided by the voltage divider circuit.

In some embodiments, each of the first plurality of loads may be configured to generate a temporary ID value based on a respective voltage level of the different voltage levels provided by the voltage divider circuit, and the master controller may be configured to assign the different CAN IDs based on the generated temporary ID values.

In some embodiments, each of the first plurality of loads may be configured to communicate with the master controller using the CAN ID assigned to the load.

In some embodiments, the first current distribution circuit may include a plurality of fuses, each configured to electrically disconnect a respective one of the first plurality of loads from the first input connector in response to a load current of the respective one of the first plurality of loads exceeding a first threshold current value.

In some embodiments, the DCFC may further include a second power supply, and a second plurality of loads connected by the serial bus. The second plurality of loads may be types of loads different from each other and from the first plurality of loads. In some embodiments, the low-voltage distribution board may further include a second input connector configured to receive power from the second power supply, a second plurality of output connectors configured to be connected to the second plurality of loads, and a second current distribution circuit configured to provide, through the second plurality of output connectors, the received power from the second power supply to the second plurality of loads.

In some embodiments, the first input connector and the second input connector may be configured to be electrically connected to each other through a removable jumper.

In some embodiments, the second current distribution circuit may include a plurality of fuses, each configured to electrically disconnect a respective one of the second plurality of loads from the second input connector in response to a load current of the respective one of the second plurality of loads exceeding a second threshold current value.

In some embodiments, the DCFC system may further include a third power supply and a third load connected to the serial bus. The third load may be a type of load different from the first plurality of loads and the second plurality of loads. In some embodiments, the low-voltage distribution board may further include: a third input connector configured to receive power from the third power supply; a third output connector configured to be connected to the third load; and a third current distribution circuit configured to provide, through the third output connector, the received power from the third power supply to the third load.

In some embodiments, the third current distribution circuit may include an overload protection circuit configured to electrically disconnect the third output connector from the third input connector in response to a load current of the third load exceeding a third threshold current value.

In some embodiments, a low-voltage distribution board is provided. The low-voltage distribution board includes: a first input connector configured to receive power from a first power supply; a first plurality of output connectors configured to be connected to a first plurality of loads; a first current distribution circuit configured to provide the received power from the first power supply to the first plurality of output connectors; and an identification (ID) assignment circuit configured to provide different ID values to each of the first plurality of output connectors.

In some embodiments, the low-voltage distribution board may be a printed circuit board (PCB).

In some embodiments, the ID assignment circuit may include a voltage divider circuit, and the different ID values may include different voltage levels provided by the voltage divider circuit.

In some embodiments, the first current distribution circuit may include a plurality of fuses, each configured to electrically disconnect a respective one of the first plurality of loads from the first input connector in response to a load current of the respective one of the first plurality of loads exceeding a first threshold current value.

In some embodiments, the low-voltage distribution board may further include a second input connector configured to receive power from a second power supply; a second plurality of output connectors configured to be connected to a second plurality of loads; and a second current distribution circuit configured to provide, through the second plurality of output connectors, the received power from the second power supply to the second plurality of loads.

In some embodiments, the first input connector and the second input connector may be configured to be electrically connected to each other through a removable jumper, and the second current distribution circuit may include a plurality of fuses, each configured to disconnect a respective one of the second plurality of loads from the second input connector in response to a load current of the respective one of the second plurality of loads exceeding a second threshold current value.

In some embodiments, the low-voltage distribution board may further include: a third input connector configured to receive power from a third power supply; a third output connector configured to be connected to a third load; and a third current distribution circuit configured to provide, through the third output connector, the received power from the third power supply to the third load. The third current distribution circuit may include an overload protection circuit configured to disconnect the third output connector from the third input connector in response to a load current of the third load exceeding a third threshold current value.

In some embodiments, a method of assigning unique communication IDs is provided.

The method includes: receiving a first voltage; dividing the first voltage into a plurality of different reduced voltages; providing each of the plurality of different reduced voltages to a respective one of a plurality of output connectors of a voltage distribution board; receiving, at a master controller, a temporary identification (ID) from each of a plurality of loads connected to the output connectors based on the reduced voltage of the respective output connector; and assigning a unique communication ID for each of the plurality of loads based on the temporary IDs.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
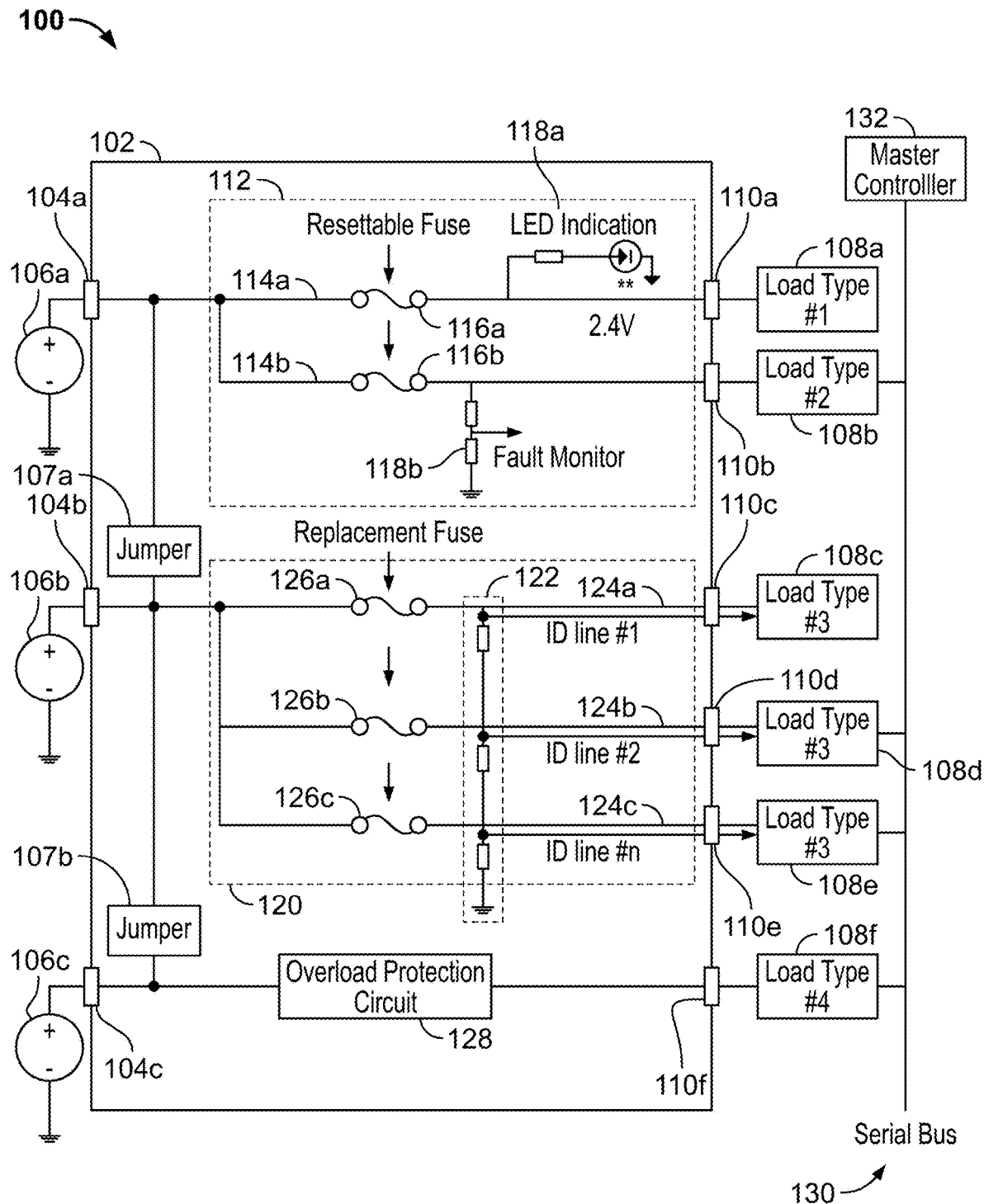
FIG. 1 is an illustrative block diagram of a smart harness, in accordance with some embodiments of the present disclosure.

FIG. 1 is an illustrative block diagram of a smart harness 100, in accordance with some embodiments of the present disclosure. In one embodiment, the smart harness 100 may be used to distribute low-voltage power (e.g., 24v) in a DCFC system, as described in greater detail below. However, this is only one example, and the smart harness 100 may be used in any suitable application that utilizes low-voltage power delivery and load monitoring. Additionally, it should be understood that, although a low-voltage system is described, the smart harness 100 may be adapted to any suitable voltage (e.g., above or below 24 v).

As shown, the smart harness 100 includes a low-voltage distribution board 102 (e.g., a printed circuit board) for providing power from a plurality of power supplies 106a, 106b, 106c to a plurality of loads 108a, 108b, 108c, 108d, 108e, 108f. Although three power supplies are shown, any suitable number of power supplies may be connected to the low-voltage distribution board 102 depending on the power requirements of the loads that are connected. Further, although six loads are shown, any suitable number of loads may be connected to the low-voltage distribution board 102. Further, jumpers 107a, 107b may be selectively inserted or removed from the low-voltage distribution board 102 to connect or isolate the plurality of power supplies 106a, 106b, 106c. For example, if only one of the plurality of power supplies (e.g., 106a) is connected to the low-voltage distribution board 102, jumpers 107a, 107b may be inserted to provide power to each of the plurality of loads (e.g., 108a-108f). Additionally, one or both of the jumpers 107a, 107b may be removed to isolate one or more of the plurality of power supplies (106a, 106b, 106c) from each other. Each of the plurality of power supplies 106a, 106b, 106c may be connected to the low-voltage distribution board 102 through the plurality of input connectors 104a, 104b, 104c. In one embodiment, each of the plurality of power supplies 106a-106c is a DC voltage source, with the same voltage levels.

As shown, the plurality of loads 108a-108f may be connected to one or more of the plurality of power supplies 106a-106c through different current distribution circuits. For example, loads 108a and 108b are connected to the first power supply 106a through a first current distribution circuit 112, loads 108c-108e are connected to the second power supply 106b through a second current distribution circuit 120, and load 108f is connected to the third power supply 106c through overload protection circuit 128 (e.g., a third current distribution circuit). Each of the first current distribution circuit 112, the second current distribution circuit 120, and the overload protection circuit 128 may be configured for different types of loads or groups of loads, as explained in further detail below.

As shown, each of the plurality of loads 108a-108f may be connected to the low-voltage distribution board 102 through output connectors 110a-110f. Each of the output connectors 110a-110f and the input connectors 104a-104c may be a PCB connector or any suitable connector for connecting components or a wire harness to a PCB board. One or more of the plurality of loads 108a-108f may also be connected to a master controller 132 through a serial bus 130. As explained in further detail below, the serial bus 130 may be a controller area network (CAN bus). However, this is only an example, and the serial bus 130 may be any suitable serial bus that allows the master controller 132 to monitor the status of one or more of the plurality of loads 108a-108f, facilitate the identification of faulty loads, etc. (e.g., without separately connecting each of the plurality of loads 108a-108f to the master controller 132 through dedicated wiring). Although the serial bus 130 is illustrated as being a separate component from the low-voltage distribution board 102, the serial bus 130 may be integrated with the low-voltage distribution board 102 such that the one or more of the plurality of loads 108a-108f are connected to the output connectors 110a-110f, and each of the one or more of the plurality of loads 108a-108f are connected to the serial bus 130. In this example, it should be understood that the integrated serial bus 130 may only connect loads connected to certain output connectors (e.g., 110b-110f). Additionally, in some embodiments, the master controller 132 may be integrated with the low-voltage distribution board 102.

As described in the ISO 11898 standards, which are hereby incorporated by reference herein in their entirety, in order for microcontrollers (MCUs) (e.g., electronic control units (ECUs)) to communicate with each other through a controller area network (CAN) bus, each of the MCUs is allocated a unique identification (ID) (e.g., a CAN ID). For different types of MCUs (e.g., associated with different types of loads), IDs may be assigned based on a serial number or other information that differentiates the MCU from other MCUs connected to the CAN bus. However, if multiple ones of the same type of MCU are connected to a same CAN bus (e.g., identical loads), MCUs may not be allocated unique IDs for communicating over the CAN bus. For example, in a conventional system, the master controller 132 would not be able to assign a unique ID for loads 108c-108e, as these loads are the same type of load (e.g., unless each of the loads 108c-108e was manually configured in advance). Additionally, even if unique IDs were assigned, the master controller 132 would not be able to identify the output connector that a particular load was connected to. Thus, in the event of a fault at one of the loads, the DCFC system would need to be inspected to determine the source of the fault. Therefore, a system for automatically assigning a unique ID to each of the loads having a same type as another load connected to the low-voltage distribution board 102 is provided, as described in greater detail below.

The loads 108a and 108b may be low-amp loads (e.g., less than 5 amps (A)) of different types. For example, as described in further detail with reference to FIG. 4, the load 108a may be a modem and the load 108b may be an ethernet box. However, this is only one example, and the loads 108a and 108b may be any low-amp loads. Because the loads 108a and 108b are different types of loads (e.g., that are able to be differentiated in a serial bus and assigned different IDs), the master controller 132 may assign different IDs (e.g., CAN IDs) to the loads 108a and 108b. For example, the master controller 132 may assign different CAN IDs based on the serial numbers associated with each of the loads 108a and 108b. In some embodiments, certain ones of the plurality of loads (e.g., the load 108a) that are not monitored by the master controller 132, may not be connected to the serial bus.

As shown, the first distribution circuit 112 includes a first trace 114a for connecting the load 108a (which is connected to a first output connector 110a) to the first power supply 106a and a second trace 114b for connecting the load 108b (which is connected to a second output connector 110b) to the first power supply 106a. Each of the first and second traces 114a, 114b may include a resettable fuse 116a, 116b for protecting the smart harness 100 if either of the loads 108a, 108b fails or short-circuits. Additionally, in the event of a fault (e.g., when one of the resettable fuses 116a, 116b trips), the first trace 114a may cease to illuminate an LED fault indicator 118a, thereby indicating a fault, while the second trace 114b may cause the fault monitor 118b to generate a fault signal (e.g., used to generate a remote notification). Although only two traces are shown, the first distribution circuit 112 may have any suitable number of traces and corresponding output connectors. Additionally, although the first distribution circuit 112 only includes one fault indicator and one fault monitor, it should be understood that the low-voltage distribution board 102 may have any suitable number of fault indicators or fault monitors. Additionally, although resettable fuses are shown, it should be understood that the resettable fuses 116a, 116b may be any suitable type of fuse (e.g., a replacement fuse as shown in the second current distribution circuit 120).

As shown, the second current distribution circuit 120 includes a plurality of traces 124a, 124b, 124c for connecting each of the loads 108c, 108d, 108e (which are connected to the output connectors 110c-110e) to the second power supply 106b. Similar to the first distribution circuit 112, each of the plurality of traces 124a, 124b, 124c may include a replacement fuse 126a, 126b, 126c (or a resettable fuse) to protect the smart harness 100 in the event of a fault (e.g., a short or over-current condition).

As shown, each of the loads 108c, 108d, 108e may be the same type of load (e.g., "load type #3"). In one example, as described in further detail with reference to FIG. 4, each of the loads 108c, 108d, 108e may all be, e.g., power electronics modules (PEMs) or dispensers 408a-408g. Because each of the loads 108c, 108d, 108e is the same type of load, the master controller 132 may not be able to distinguish between the loads 108c, 108d, 108e when connected to the serial bus 130 or determine which output connecter (e.g., 100a-110f) a particular load is connected to. Thus, as shown, the second current distribution circuit 120 further includes an ID assignment circuit 122 configured to provide different ID values to each of the loads 108c, 108d, 108e (e.g., at the corresponding output connectors 110c-110e). As explained in further detail below with reference to FIG. 2, based on these different ID values, the master controller 132 may be configured to automatically assign different CAN IDs to each of the loads 108c, 108d, 108e. Thus, for example, each of the loads 108c, 108d, 108e may be individually monitored by the master controller 132 through the serial bus 130, along with other loads connected through the serial bus 130, without requiring any special configuration of each of the loads 108c, 108d, 108e before they are connected to the low-voltage distribution board 102. Although only a single group of loads of the same type is shown (e.g., 108c, 108d, 108e), it should be understood that low-voltage distribution board 102 may include additional current distribution circuits (e.g., for other groups of identical loads) or additional traces. Additionally, although the ID assignment circuit 122 is shown as being connected to the trace 124a after replacement fuse 126a, it should be understood that the ID assignment circuit 122 may be connected directly to one or more of the plurality of power supplies 106a-106c (e.g., through a dedicated fuse) so that the ID assignment circuit 122 is able to continue operating even if replacement fuse 126a trips.

As shown, the overload protection circuit 128 connects the load 108f (e.g., "load type #4") to the third power supply 106c, as described in further detail below. The load 108f may be a high-amp load (e.g., 15A). For example, as described in further detail with reference to FIG. 4, the load 108f may be a cooling pump or heater. The overload protection circuit 128 is explained in further detail below with reference to FIG. 3.

It should be understood that the low-voltage distribution board 102 may be configured to accommodate any suitable number and type of loads. For example, in some embodiments, the overload protection circuit 128 may be omitted, and high-amp loads may be connected to a power supply by a trace (e.g., the first or second current distribution circuits).

Figure 2:
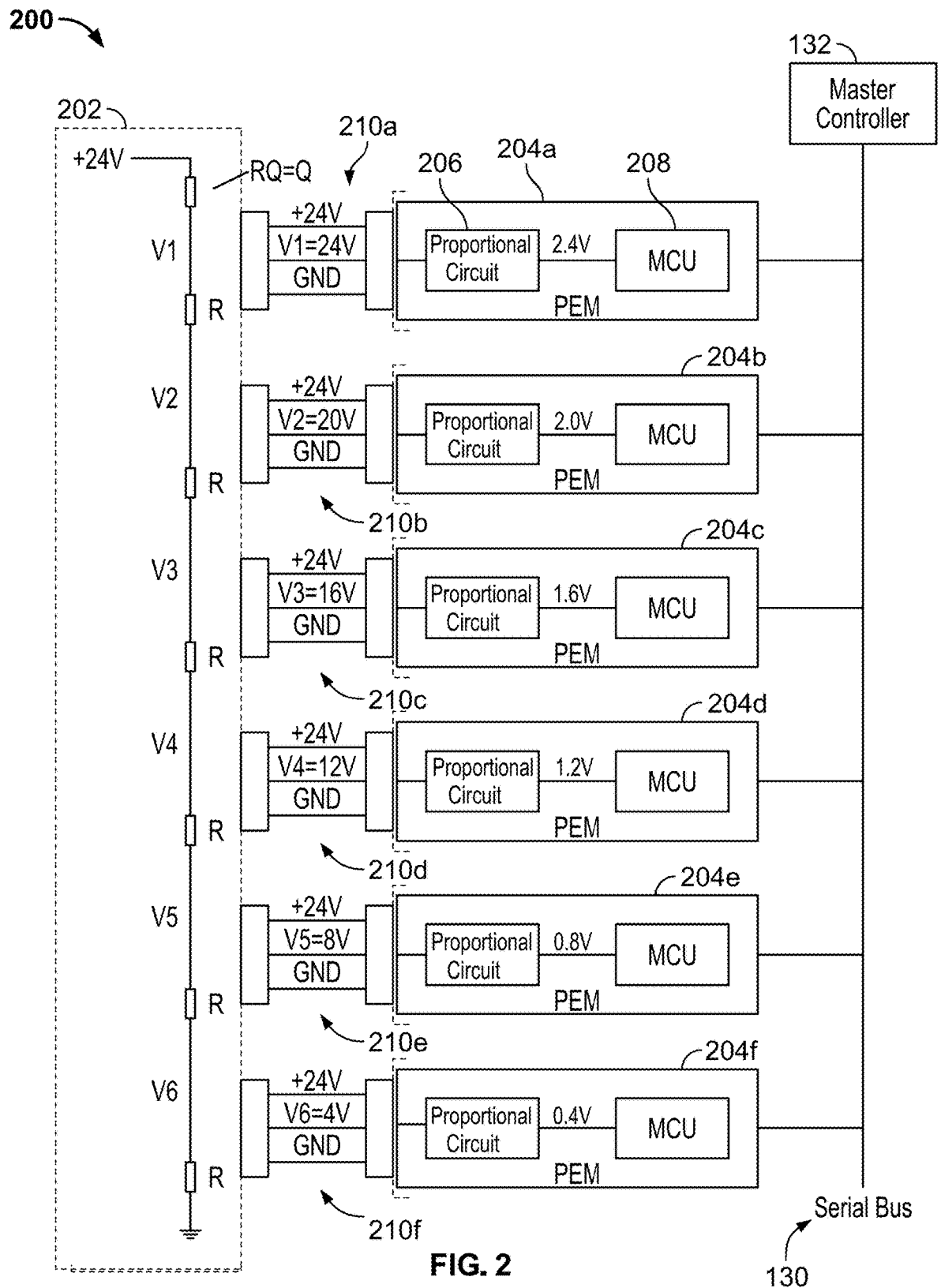
FIG. 2 is an illustrative block diagram of an ID assignment system including an ID assignment circuit for assigning IDs to a plurality of loads, in accordance with some embodiments of the present disclosure.

FIG. 2 is an illustrative block diagram of an ID assignment system 200 including an ID assignment circuit 202 for assigning IDs to a plurality of loads (204a-204f), in accordance with some embodiments of the present disclosure. The ID assignment circuit 202 is an example of the ID assignment circuit 122 of FIG. 1. As shown, the ID assignment system 200 may include the ID assignment circuit 202 connected to a plurality of loads 204a-204f through output connectors 210a-210f (e.g., for generating different codes for each of the plurality of loads 204-204f).

As shown, the ID assignment circuit 202 includes a plurality of resistors arranged in a voltage divider circuit and configured to generate a different voltage for each of the plurality of output connectors 210a-210f (e.g., 24V, 20V, 16V, 12V, 8V, and 4V). The voltage level of each of the generated voltages may correspond to the number of resistors in the voltage divider and the voltage level of the power supplied from one of the plurality of power supplies (e.g., 106a-106c).

As shown, each of the plurality of loads 204a-204f is the same type of load (e.g., an identical load). For example, each of the plurality of loads 204a-204f is a power electronics module (PEM). In the illustrated example, each of the plurality of loads includes a proportional circuit (e.g., differential amplifier based linear circuit) 206 and an MCU 208. The proportional circuit 206 may step down the voltage received from the ID assignment circuit 202 to a voltage level suitable for the MCU 208. For example, for the load 204a, the proportional circuit 206 steps down the voltage V1 by a factor of ten (e.g., from 24V to 2.4V). In some embodiments, the proportional circuit 206 may be omitted or replaced by another voltage divider depending on the output voltages from the ID assignment circuit 202 at each of the plurality of output connectors 210a-210f and the input voltage requirements of the MCU 208. In some embodiments, the low-voltage distribution board (e.g., 102) may include voltage regulation circuitry for conditioning voltages generated by the ID assignment circuit 202.

As shown, each of the respective MCUs 208 receives a different voltage output (e.g., from the corresponding proportional circuit 206). For example, for the load 204a, the MCU 208 may receive a voltage of 2.4V. Based on the received voltage, the MCU 208 may generate a temporary ID to communicate with the master controller 132 via the serial bus 130. Based on the temporary ID received from each of the plurality of loads 204a-204f, the master controller 132 may generate a unique ID for each of the plurality of loads 204a-204f. For example, the master controller 132 may automatically assign a unique CAN ID to each of the plurality of loads 204a-204f. As each of the plurality of loads 204a-204f is assigned a unique CAN ID, the master controller 132 may be configured to monitor the status of loads connected to the serial bus 130 (e.g., 204a-204f) and facilitate the identification of faulty loads. Additionally, because the voltages generated by the ID assignment circuit 202 decrease for each of the plurality of output connectors 210a-210f, the master controller 132 is able to associate each of the plurality of loads 204a-204f with a specific output connector of the plurality of output connectors 210a-210f. Additionally, because each of the plurality of loads 204a-204f is assigned a CAN ID after being connected to any output connecter of the low-voltage distribution board 102, a load is able to be connected to any of the plurality of output connectors 210a-210f without first configuring the load or connecting the load to a certain output connector.

Figure 3:
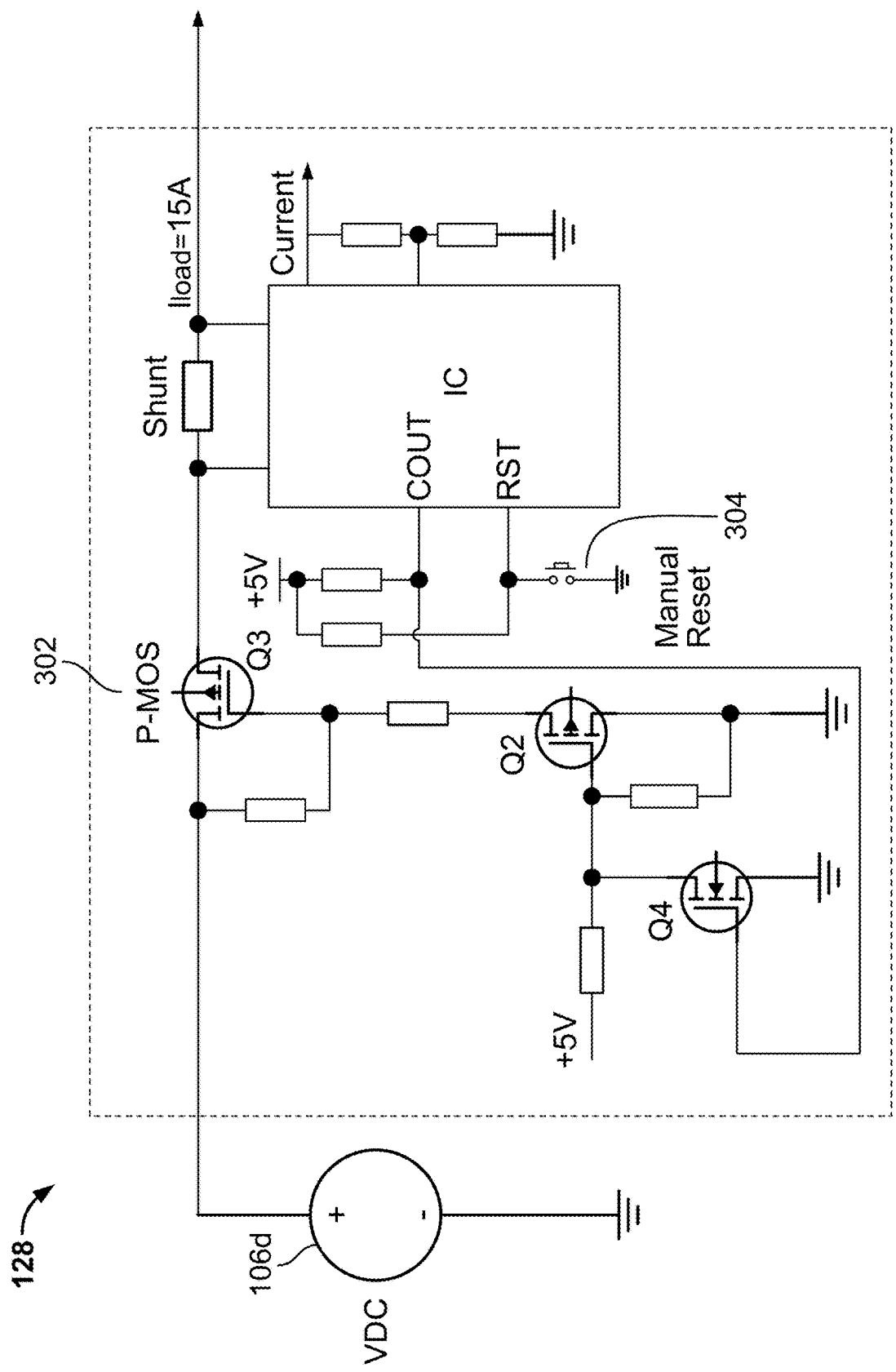
FIG. 3 is an illustrative block diagram of the overload protection circuit of FIG. 1, in accordance with some embodiments of the present disclosure.

FIG. 3 is an illustrative block diagram of the overload protection circuit 128 of FIG. 1, in accordance with some embodiments of the present disclosure. As described above, the overload protection circuit 128 may be used to provide power to higher-current loads (e.g., 15A loads). As shown, the overload protection circuit includes a protection circuit including a plurality of circuit elements (e.g., transistors, resistors, integrated circuit (IC), etc.) arranged to switch off transistor 302 when the current (e.g., "$I_{load}$") exceeds a threshold current level (e.g., 15A). As shown, the protection circuit includes a manual reset 304 for resetting the overload protection circuit 128 after a fault. In some embodiments, the manual reset 304 may be replaced with a remote reset configured to be reset remotely. In some embodiments, the low-voltage distribution board may include a voltage regulator to provide a low voltage (e.g., 5V) to the overload protection circuit 128. Compared to the first and second current distribution circuits 112 and 120, the overload protection circuit 128 may provide more sophisticated current-monitoring and protection for high-current loads.

Figure 4:
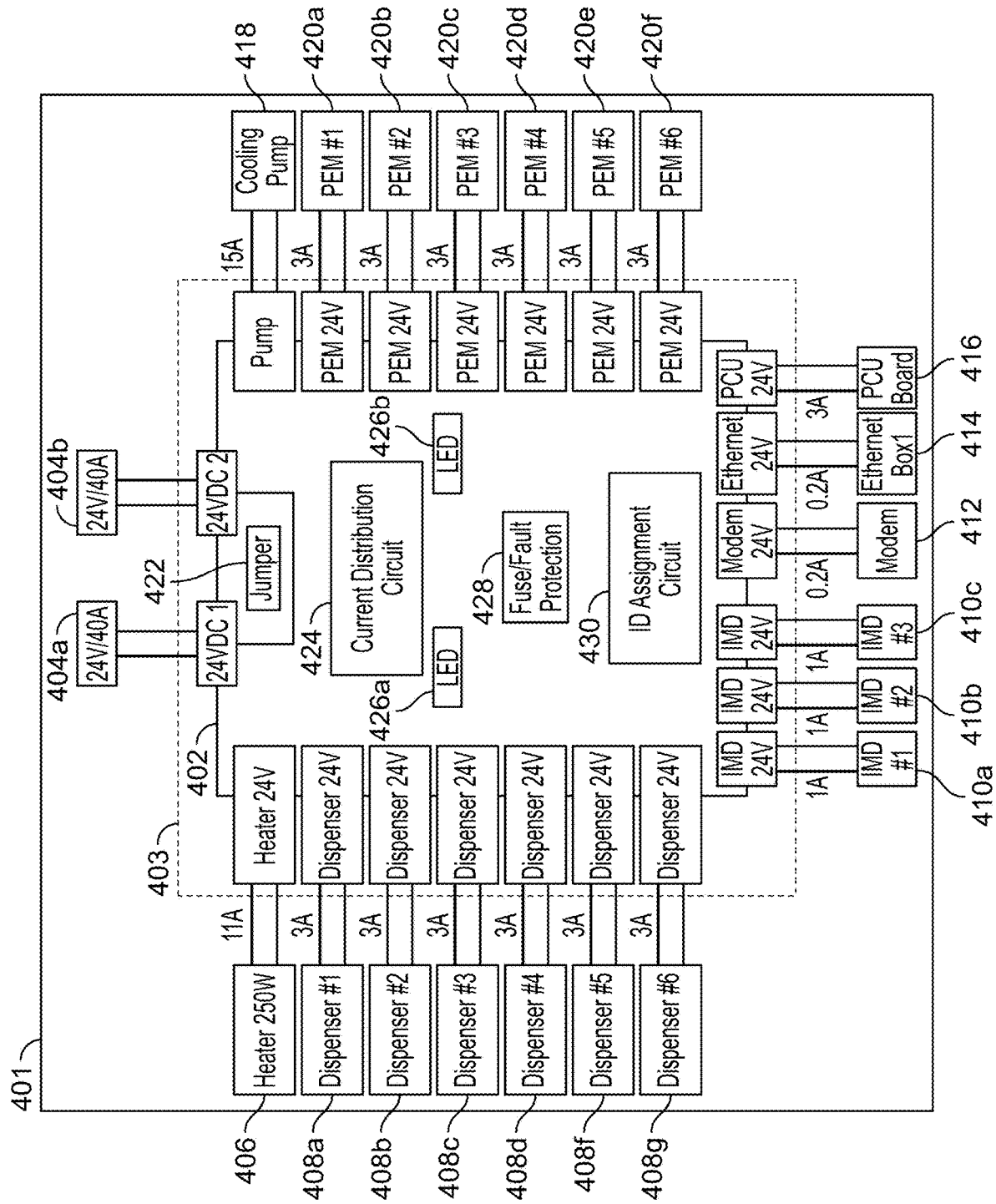
FIG. 4 is an illustrative block diagram of a DCFC system including an exemplary smart harness, in accordance with some embodiments of the present disclosure.

FIG. 4 is an illustrative block diagram of a DCFC system 401 including an exemplary smart harness 403, in accordance with some embodiments of the present disclosure. The DCFC system 401 may be configured to charge an electric vehicle. However, this is only an example, and the smart harness 403 may be implemented in any suitable system. The smart harness 403 includes a low-voltage distribution board 402 including a plurality of input connectors and output connectors, as similarly described above with reference to FIG. 1. As shown, the DCFC system 401 includes a plurality of power supplies 404a, 404b connected to input connectors of the low-voltage distribution board 402 and configured to provide power to the low-voltage board 402. The DCFC system 401 includes a plurality of different types of loads. For example, the DCFC system 401 includes a heater 406, a plurality of dispensers 408a-408g, a plurality of insulation monitor devices (IMDs) 410a-410c, a modem 412, an ethernet box 414, a power cabinet controller (PCU) board 416, a cooling pump 418, and a plurality of PEMs 420a-420f. The PCU board 416 may act as a master controller for monitoring one or more of the plurality of loads through a serial bus (e.g., the master controller 132 described above with reference to FIGS. 1 and 2).

As similarly described above, the low-voltage distribution board 402 includes a jumper 422, a current distribution circuit 424, a plurality of LEDs 426a, 426b, fuse/fault protection 428, and an ID assignment circuit 430. The jumper 422 may electrically connect the first and second power supplies 404a, 404b. The current distribution circuit 424 provides power from the first and second power supplies 404, 404b to each of the plurality of loads and the fuse/fault protection circuit may protect the smart harness 403 during a fault. Although only a single current distribution circuit 424, jumper 422, fuse/fault protection 428, and ID assignment circuit 430 are shown, it should be understood that the low-voltage distribution board 402 may include any suitable number of the illustrated components.

As described above, loads of different types (e.g., the heater 406 and the cooling pump 418) may be distinguished from each other on the serial bus by the PCU board 416. For example, certain loads may have dedicated output connectors at the low-voltage distribution board 402. However, the PCU board 416 is not able to distinguish between loads of the same type (e.g., the plurality of dispensers 408a-408g; the plurality of PEMs 420a-420f) or, e.g., determine the specific output connector that each of the loads of the same type is connected to. Thus, the ID assignment circuit 430 may generate different voltages for each of the plurality of dispensers 408a-408g and the plurality of PEMs 420a-420g, and the PCU board 416 may generate unique IDs (e.g., CAN IDs) for each of the plurality of dispensers 408a-408g and the plurality of PEMs 420a-420g, as described above with reference to FIG. 2. Based on the unique IDs, the PCU board 416 may monitor the status of the different loads (e.g., 406-420f) and facilitate the identification of faulty loads in real time, without requiring dedicated wiring for separately connecting with each of the loads. For example, the PCU board 416 may generate a report indicating a detected fault of a particular load and identify the output connector that the particular load is connected to. In one embodiment, the DCFC system 401 may upload the report to a remote server so that the DCFC system 401 may be monitored remotely. However, it should be understood that reports of detected faults may be transmitted or generated for presentation in any suitable manner.

Figure 5:
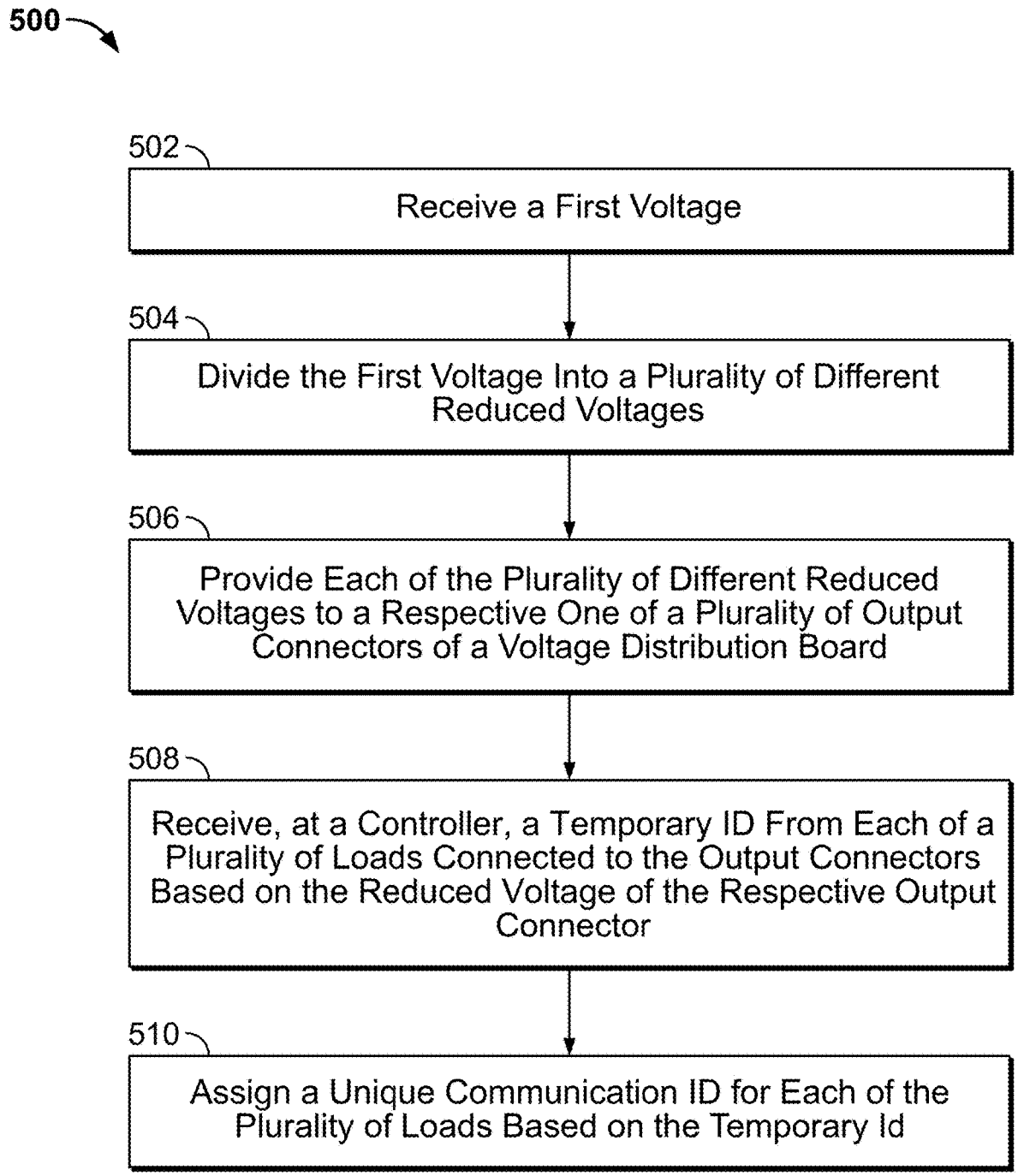
FIG. 5 shows a flowchart of an illustrative process for automatically assigning a unique communication ID for each of a plurality of loads connected to a low-voltage distribution board, in accordance with some embodiments of the present disclosure.

FIG. 5 shows a flowchart of an illustrative process 500 for automatically assigning a unique communication ID for each of a plurality of loads connected to a low-voltage distribution board, in accordance with some embodiments of the present disclosure. The process 500 may be performed by a DCFC system (e.g., the DCFC system 401) including an ID assignment system (e.g., the ID assignment system 200).

At 502, an ID assignment system (e.g., the ID assignment system 200) receives a first voltage. For example, as illustrated in FIG. 1, the low-voltage distribution board 102 may receive the first voltage from a power supply (e.g., the power supply 106b, through an input connector (e.g., input connector 104b). In one example, the received first voltage may be 24V.

At 504, an ID assignment circuit (e.g., the ID assignment circuit 202) divides the received voltage into a plurality of different reduced voltages. For example, as shown, the ID assignment circuit 202 divide the received voltage into voltages of 24V, 20V, 16V, 12V, 8V, and 4V.

At 506, the ID assignment circuit (e.g., the ID assignment circuit 202) provides each of the plurality of different reduced voltages to a respective one of a plurality of output connectors (e.g., output connectors 210a-210f) of the voltage distribution board (e.g., the low-voltage distribution board 102).

At 508, a controller (e.g., the master controller 132) receives a temporary ID from each of a plurality of loads (e.g., the loads 204a-204f) connected to the output connectors (e.g., output connectors 210a-210f) based on the reduced voltage of the respective output connector. For example, an MCU (e.g., the MCU 208) of each of the plurality of loads (e.g., the loads 204a-204f) may generate and transmit (e.g., over the serial bus 130) a temporary ID to the controller based on the reduced voltage received by the MCU.

At 510, the controller (e.g., the master controller 132) assigns a unique communication ID (e.g., a CAN ID) for each of the plurality of loads (e.g., the loads 204a-204f) based on the received temporary ID. Based on the assigned unique communication IDs, the controller is able to monitor the status of loads connected to the serial bus (e.g., 204a-204f) and facilitate the identification of faulty loads.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A direct current fast charging (DCFC) system, comprising:
    a first power supply;
    a first plurality of loads connected by a serial bus;
    a low-voltage distribution board comprising:
        a first input connector configured to receive power from the first power supply;
        a first plurality of output connectors, wherein the first plurality of output connectors is configured to be connected to the first plurality of loads;
        a first current distribution circuit configured to provide, through the first plurality of output connectors, the received power from the first power supply to the first plurality of loads;
        an identification (ID) assignment circuit configured to provide, through the first plurality of output connectors, different ID values to each of the first plurality of loads; and
    a master controller configured to, based on the ID assignment circuit providing the different ID values, assign a respective serial bus ID to each of the first plurality of loads.

2. The DCFC system of claim 1, wherein:
    the serial bus is a controller area network (CAN) bus,
    each of the first plurality of loads is connected to the master controller by the CAN bus, and
    the assigned respective serial bus IDs are CAN IDs.

3. The DCFC system of claim 2, wherein each of the first plurality of loads is a same type of load, and wherein the master controller is configured to use the different ID values to:
    distinguish between respective loads of the first plurality of loads, or
    determine specific output connectors to which respective loads of the first plurality of loads are connected.

4. The DCFC system of claim 2, wherein:
    the ID assignment circuit comprises a voltage divider circuit, and the different ID values comprise different voltage levels provided by the voltage divider circuit.

5. The DCFC system of claim 4, wherein:
each load of the first plurality of loads is configured to generate a respective temporary ID value based on a respective voltage level of the different voltage levels provided by the voltage divider circuit, wherein the master controller is configured to automatically assign the respective serial bus ID to each load of the first plurality of loads based on the respective temporary ID values.

6. The DCFC system of claim 5, wherein each of the first plurality of loads is configured to communicate with the master controller using the CAN ID assigned to the load.

7. The DCFC system of claim 1, wherein the first current distribution circuit comprises a plurality of fuses, each configured to electrically disconnect a respective one of the first plurality of loads from the first input connector in response to a load current of the respective one of the first plurality of loads exceeding a first threshold current value.

8. The DCFC system of claim 1, further comprising:
a second power supply; and
a second plurality of loads connected by the serial bus, wherein the second plurality of loads are types of loads different from each other and from the first plurality of loads,
wherein the low-voltage distribution board further comprises:
a second input connector configured to receive power from the second power supply;
a second plurality of output connectors, wherein the second plurality of output connectors is configured to be connected to the second plurality of loads; and
a second current distribution circuit configured to provide, through the second plurality of output connectors, the received power from the second power supply to the second plurality of loads.

9. The DCFC system of claim 8, wherein the first input connector and the second input connector are configured to be electrically connected to each other through a removable jumper.

10. The DCFC system of claim 8, wherein the second current distribution circuit comprises a plurality of fuses, each configured to electrically disconnect a respective one of the second plurality of loads from the second input connector in response to a load current of the respective one of the second plurality of loads exceeding a second threshold current value.

11. The DCFC system of claim 8, further comprising:
a third power supply; and
a third load connected to the serial bus, wherein the third load is a type of load different from the first plurality of loads and the second plurality of loads,
wherein the low-voltage distribution board further comprises:
a third input connector configured to receive power from the third power supply;
a third output connector, wherein the third output connector is configured to be connected to the third load; and
a third current distribution circuit configured to provide, through the third output connector, the received power from the third power supply to the third load.

12. The DCFC system of claim 11, wherein the third current distribution circuit comprises an overload protection circuit configured to electrically disconnect the third output connector from the third input connector in response to a load current of the third load exceeding a third threshold current value.

13. A power distribution system comprising:
a low-voltage distribution board comprising:
a first input connector configured to receive power from a first power supply;
a first plurality of output connectors, wherein the first plurality of output connectors is configured to be connected to a first plurality of loads;
a first current distribution circuit configured to provide the received power from the first power supply to the first plurality of output connectors; and
an identification (ID) assignment circuit configured to provide different ID values to each of the first plurality of output connectors; and
a master controller configured to, based on the ID assignment circuit providing the different ID values, assign a respective serial bus ID to each of the first plurality of loads.

14. The power distribution system of claim 13, wherein the low-voltage distribution board is a printed circuit board (PCB).

15. The power distribution system of claim 13, wherein:
the ID assignment circuit comprises a voltage divider circuit, and
the different ID values comprise different voltage levels provided by the voltage divider circuit.

16. The power distribution system of claim 13, wherein the first current distribution circuit comprises a plurality of fuses, each configured to electrically disconnect a respective load of the first plurality of loads from the first input connector in response to a load current of the respective load of the first plurality of loads exceeding a first threshold current value.

17. The power distribution system of claim 13, further comprising:
a second input connector configured to receive power from a second power supply;
a second plurality of output connectors, wherein the second plurality of output connectors is configured to be connected to a second plurality of loads; and
a second current distribution circuit configured to provide, through the second plurality of output connectors, the received power from the second power supply to the second plurality of loads.

18. The power distribution system of claim 17, wherein:
the first input connector and the second input connector are configured to be electrically connected to each other through a removable jumper, and
the second current distribution circuit comprises a plurality of fuses, each configured to disconnect a respective one of the second plurality of loads from the second input connector in response to a load current of the respective one of the second plurality of loads exceeding a second threshold current value.

19. The power distribution system of claim 17, further comprising:
a third input connector configured to receive power from a third power supply;
a third output connector, wherein the third output connector is configured to be connected to a third load; and
a third current distribution circuit configured to provide, through the third output connector, the received power from the third power supply to the third load,
wherein the third current distribution circuit comprises an overload protection circuit configured to disconnect the third output connector from the third input connector in response to a load current of the third load exceeding a third threshold current value.

20. A method, comprising:

receiving a first voltage;

dividing the first voltage into a plurality of different reduced voltages, each of the plurality of different reduced voltages corresponding to a respective different ID value;

providing each of the respective different ID values to a respective output connector of a plurality of output connectors of a voltage distribution board;

receiving, at a master controller, a temporary identification (ID) value from each load of a plurality of loads connected to the output connectors, wherein each temporary ID value is generated by each load based on the respective different ID value; and based on the temporary ID values received from each load of the plurality of loads connected to the output connectors, assigning, using the master controller, a unique serial bus ID for each load of the plurality of loads, wherein each unique serial bus ID is based on the corresponding temporary ID value.

* * * * *